United States Patent [19]

Nicholas et al.

[11] Patent Number: 4,861,351
[45] Date of Patent: Aug. 29, 1989

[54] PRODUCTION OF HYDROGEN AND CARBON MONOXIDE

[75] Inventors: David M. Nicholas, New Tripoli; Jeffrey A. Hopkins, Whitehall; Joseph P. Bushinsky, Allentown, all of Pa.

[73] Assignee: Air Products and Chemicals, Inc., Allentown, Pa.

[21] Appl. No.: 97,573

[22] Filed: Sep. 16, 1987

[51] Int. Cl.$^4$ .............................................. B01D 53/04
[52] U.S. Cl. .......................................... 55/23; 55/26; 55/31; 55/58; 55/62; 55/68; 55/75
[58] Field of Search ............... 55/23, 25, 26, 31, 33, 55/58, 62, 68, 73–75

[56] References Cited

U.S. PATENT DOCUMENTS

| | | | |
|---|---|---|---|
| Re. 31,014 | 8/1982 | Sircar | 55/26 |
| 2,497,421 | 2/1950 | Shiras | 55/23 |
| 3,011,589 | 12/1961 | Meyer | 55/23 |
| 3,085,379 | 4/1963 | Kiyonaga et al. | 55/23 |
| 3,150,942 | 9/1964 | Vasan | 55/31 |
| 3,359,744 | 12/1967 | Bolez et al. | 62/36 |
| 3,479,298 | 11/1969 | Sze et al. | 252/373 |
| 3,564,816 | 2/1971 | Batta | 55/26 |
| 3,788,037 | 1/1974 | Shell et al. | 55/58 |
| 3,838,553 | 10/1974 | Doherty | 55/58 |
| 4,057,403 | 11/1977 | Valdes | 55/31 |
| 4,077,779 | 3/1978 | Sircar et al. | 55/25 |
| 4,171,207 | 10/1979 | Sircar | 55/26 |
| 4,448,757 | 5/1984 | Barnwell et al. | 55/23 X |
| 4,705,541 | 11/1987 | Sircar | 55/26 |
| 4,711,645 | 12/1987 | Kumar | 55/26 |
| 4,717,397 | 1/1988 | Wiessner et al. | 55/26 |

Primary Examiner—Robert Spitzer
Attorney, Agent, or Firm—Geoffrey L. Chase; James C. Simmons; William F. Marsh

[57] ABSTRACT

Substantially pure hydrogen and high purity carbon monoxide are produced and recovered from a methane-rich gas composition, such as natural gas, by subjecting such composition to steam reforming in a first stage at relatively mild conditions, followed by secondary oxidative reforming of the thus obtained primary reformate effecting conversion of residual methane therein to carbon oxides. The secondary reformate, comprised chiefly of hydrogen, CO, and $CO_2$, is subjected to a novel sequence of operations for separation of these individual components. $CO_2$ is first removed by solvent absorption, followed by selective adsorption for separation of CO from the $CO_2$-freed gas mixture with attendant recovery of hydrogen product of 98+% purity as an unsorbed effluent. Trace to small amounts of undesired carbon monoxide in the thus recovered hydrogen product can be converted by catalytic methanation.

8 Claims, 3 Drawing Sheets

*PRIOR ART METHOD*

PRODUCTION OF HYDROGEN AND CARBON MONOXIDE

TECHNICAL FIELD

The present invention is concerned with gas separation processes, more particularly with systems and methods for recovering major individual components from gas mixtures.

BACKGROUND OF THE INVENTION

Various gas mixtures are available from natural sources as well as in products and by-products of known chemical processes. A number of different techniques have been employed or proposed for recovery of one or more individual components from such gas mixtures, including among these: absorption in selective solvents, cryogenic fractionation, selective adsorption by solid adsorbents, and certain combinations of such unit operations.

Natural gas, for example, typically comprises in the order of from about 50 up to about 90 volume percent methane, with about 4% or 5% and up to 40%–50% $C_2$–$C_6$ hydrocarbons, up to about 5% or 6% hydrogen, and the remainder made up chiefly of carbon dioxide (less than about 1%) and nitrogen (less than ½%). Among known industrial uses for natural gas, other than its use as fuel, is as a source for production therefrom of hydrogen and other valuable products.

Among conventional processing of natural gas or other methane-rich gas mixtures is that of reforming, particularly that carried out by reaction with steam, according to the equations:

$$CH_4 + H_2O \rightarrow CO + 3H_2$$

$$CH_4 + 2H_2O \rightarrow CO_2 + 4H_2$$

The separation of hydrogen from the oxides of carbon in the reformate by present technology is relatively costly from the stanpoint of initial capital investment as well as operating costs incurred in the energy-intensive methods employed. Conventional processes generally combine treatment of the starting mixed gas charge with a selective solvent absorbent, such as monoethanolamine (MEA), to remove the bulk of the $CO_2$ followed by cooling to cryogenic temperatures for separation of the carbon monoxide from hydrogen. Regeneration of the absorbent requires considerable energy input, which is largely obtained from process waste heat that would otherwise be available for production of steam.

Since small amounts of both water and $CO_2$ still remain in the process gas effluent from the absorber, it is necessary to provide sorbent driers in the system to prevent these species from freezing out in the gas chilling equipment (cold box). These driers further intensify the already significant capital costs.

As illustrated in FIG. 1, the conventional "state-of-the-art" system for separation of individual components from a gas mixture comprising $H_2$, CO, and $CO_2$, such as a gas mixture derived by steam reforming of a methane-rich gas composition, entails the use of a solvent absorbent (generally monoethanolamine) for removal of $CO_2$, a so-called "cold box" for bulk separation of the carbon monoxide from its mixture with hydrogen at cryogenic temperatures, and a solid adsorbent unit (PSA) for further purification of the crude hydrogen evolved. The crude hydrogen product obtained from the cold box is about 98% pure and may be brought to about 99.9% purity in the PSA unit. The described operation typically provides about 85% hydrogen recovery, the reject gas being utilized as fuel in the reformer furnace.

PRIOR ART

U.S. Pat. No. 3,150,942 discloses a process for purification of an impure hydrogen gas stream containing carbon dioxide, water vapor, and carbon monoxide as principal impurities, such as such stream obtained by steam reforming of natural gas. The impure hydrogen feed is passed through a first molecular sieve bed (13x) selective for sorption of water and carbon dioxide and then through a second molecular sieve bed (Type 4A or 5A) selective in sorption of carbon monoxide, thereby producing a substantially pure hydrogen effluent (99.8% $H_2$). Alternatively, the hydrogen effluent from the second bed may be of lower purity and brought to desired maximum purity by known catalytic methanation of contained carbon monoxide.

U.S. Pat. No. 3,838,553 discloses separation of a light gas, such as hydrogen or helium from a mixed gas stream, employing according to one disclosed embodiment, an initial low temperature separator unit from which the separated light gas component is recovered by fractional cryogenic distillation, and purified in a pressure swing absorber unit.

The reject gas desorbed in regeneration of the adsorbent bed is recompressed and mixed with the feed charged to the low temperature separation unit. In accordance with an alternative embodiment disclosed in the patent, the mixed gas stream may be first charged to the PSA system, recovering the unsorbed light gas component effluent, the reject gas desorbed from the PSA bed being compressed, and passed to the low temperature unit for removal of heavier contaminants while the partially purified light gas is recycled to feed.

Cryogenic separation and removal of methane and/or other hydrocarbons from a crude hdyrogen stream is disclosed in U.S. Pat. No. 3,359,744. The crude hydrogen steam is charged to a cold box wherein the charge is chilled by autogeneous heat exchange, whereby hydrocarbons are condensed and separated. A portion of the purified hydrogen recovered is mixed with the condensate and employed to refrigerate the incoming crude hydrogen. The required low temperature is provided by passing the condensate through a J–T expansion device. In the described operation of the patent, the crude hydrogen charge needs to be dried before introduction into the cold box.

By the method disclosed in U.S. Pat. No. 3,479,298 high purity hydrogen is produced and recovered from natural gas or other light hydrocarbon feed by a method including two-stage reforming. The hydrocarbon feed stream is admixed with steam and reacted in the presence of a reforming catalyst in a primary reforming zone. The hydrogen-containing gaseous effluent of the reaction is then mixed with a preheated gas mixture comprised of steam and free oxygen-containing gas (air), and the combined mixtures passed through a secondary reforming zone from which there is withdrawn a gaseous effluent rich in hydrogen.

SUMMARY OF THE INVENTION

By the novel process of the present invention, hydrogen and carbon monoxide are obtained and individually recovered from a charge stock such as natural gas or other gas mixture rich in methane, at reduced capital and operating costs. In accordance with the invention, the charge stock is initially subjected to primary reforming in a first-stage reaction with steam at relatively mild conditions and the obtained primary reformate then treated with oxygen in a secondary reforming stage for further reactive conversion of remaining methane. The product obtained by the two-stage reforming is comprised chiefly of hydrogen, oxides of carbon (CO and $CO_2$), and water. The major part of the contained carbon dioxide is separated out from the reformate by absorption in a solvent followed by removal of residual condensed water. The remaining reformate composition is subjected to treatment in a multi-column pressure swing adsorption system (PSA) wherein a product stream of high purity carbon monoxide is recovered by desorption and the separated hydrogen effluent is purified and freed of residual carbon monoxide by methanation.

PRIOR ART PROBLEMS

Figure 1:
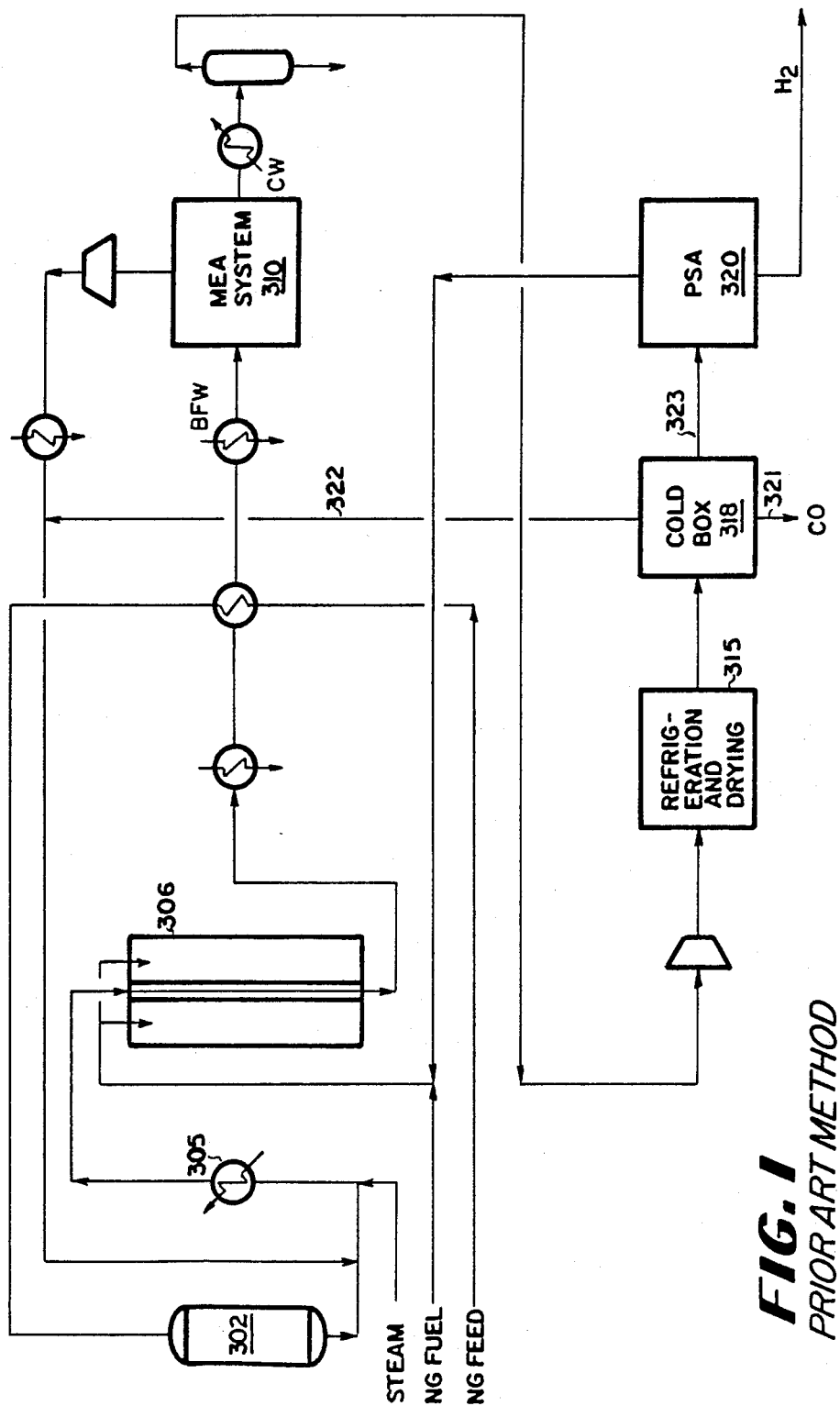
FIG. 1 of the accompanying drawings is a process flow diagram of a prior art method for individual recovery of hydrogen and carbon monoxide from a gas mixture produced by steam reforming of natural gas.

A conventional "state-of-the-art" system for production of hydrogen and carbon monoxide by steam-methane reforming and recovery of these components from the reformate as illustrated in FIG. 1, comprises principally the reformer furnace 306 preceded by a desulfurizing unit 302, a solvent absorbent unit 310 (MEA absorber and stripper and required heat exchangers) for removal of $CO_2$ from the reformate, means 315 for refrigerating and drying the $CO_2$-freed product gas, a cold box unit 318 for cryogenic separation of CO, and a multi-column PSA system 320 for purifying the crude hydrogen product discharged from the cold box. The solvent absorbent unit 310 is placed in series with the cold box 318 so as to remove the $CO_2$ prior to separation of the C and $H_2$. Since small amounts of water as well as $CO_2$ still remain in the process gas effluent from the MEA absorber unit, the adsorbent driers at 315 must be employed to prevent these species from freezing out in the cold box. The need for the driers thus intensifies the already significant capital and operating costs of these prior art systems.

In the typical operation of a prior art system, such as that illustrated in FIG. 1, the natural gas or other methane rich feed gas, after being desulfurized at 302, is mixed with steam and recycle, preheated by exchange as shown at 305, and reacted in steam-methane reforming furnace 306, typically producing an effluent having about 2.7 $H_2$/CO mole ratio. The reformer effluent is cooled to a temperature in the order of about 100° F. and contained $CO_2$ is removed by absorption in a solvent, such as monoethanolamine (MEA), to a residual content of 20 to 100 ppm (dry basis). Process gas discharged from the absorber (310) is compressed, refrigerated, and further dried (at 315) before entering the cold box 318 at about 45° F. In the cold box operation, CO and $CH_4$ are separated from hydrogen after cooling in a series of flash drums (not shown). The obtained $CO/CH_4$ stream is further cooled and introduced into a cryogenic distillation column from which the CO product of up to about 99.5% purity (line 321) is withdrawn overhead while the $CO/CH_4$ "bottoms" fraction is recycled for addition to the fresh reformer feed (line 322). The hydrogen product (line 323) exits the cold box about 98% pure and is further purified by selective adsorption of accompanying contaminants therefrom in a multi-column PSA system 320, producing hydrogen of 99.9% purity. Hydrogen recovery through the PSA system is typically about 85%, with the reject being utilized as fuel for the reformer furnace.

DETAILED DESCRIPTION OF THE INVENTION

Figure 2:
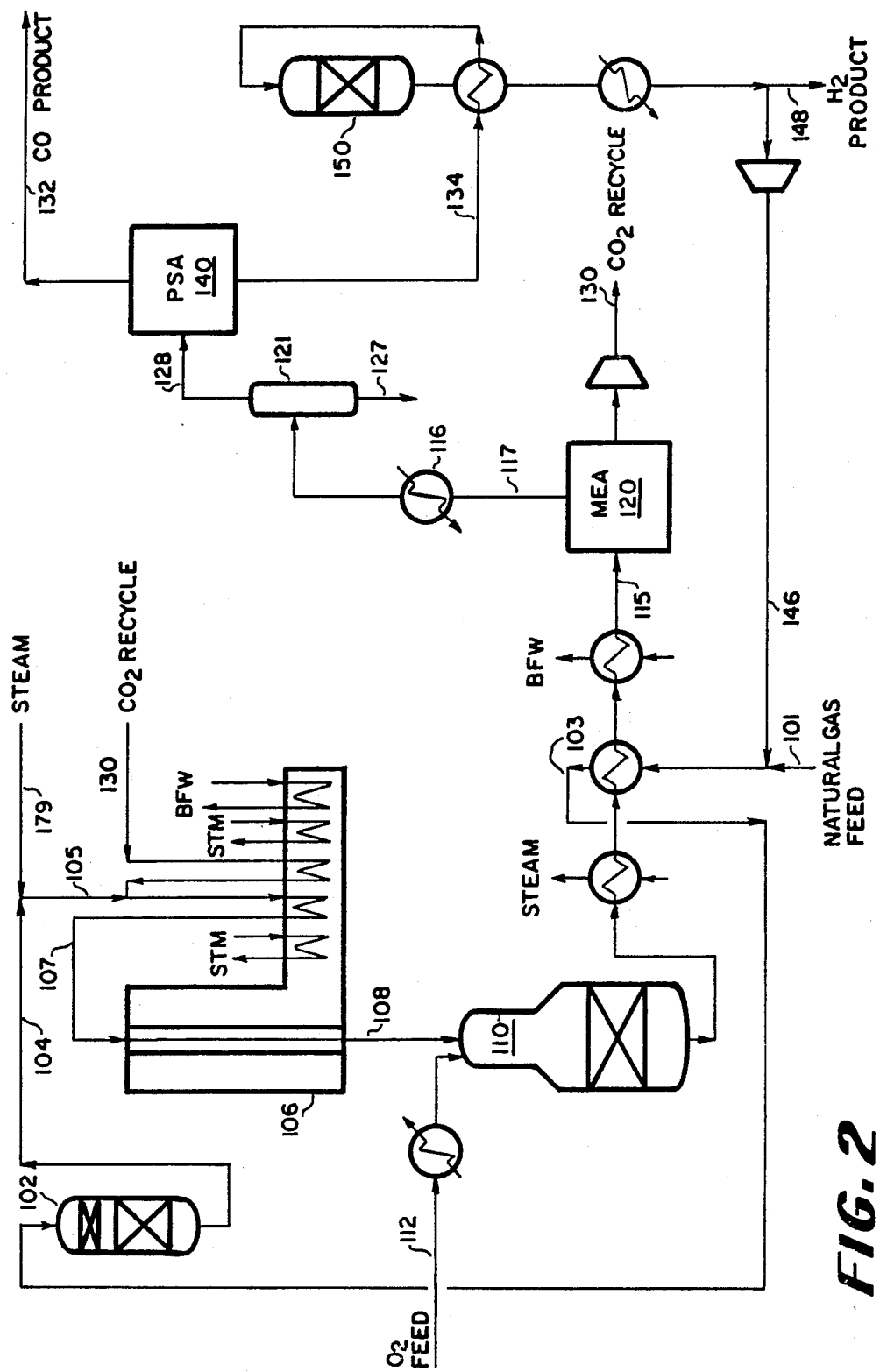
FIG. 2 is a process flow diagram of a process according to the invention for production and recovery of hydrogen and carbon monoxide from a gas produced by steam reforming of natural gas followed by secondary reforming.

In the preferred practice of the invention, as illustrated by the flow diagram in FIG. 2, the natural gas fed (or other methane-rich gas stream) 101 is mixed with a part of the hydrogen product supplied through line 146 and the resulting mixture is preheated by indirect exchange with hot process gas to provide stream 103. Prior to its introduction into primary reforming furnace 106 the stream 103 composition is desulfurized at 102 and the desulfurized effluent 104 is mixed with steam (from line 179) and recycled $CO_2$ supplied through line 130. The thus obtained mixed stream is introduced by line 105 into the convection section of furnace 106 for further heating and then passed by line 107 into the catalyst-containing tubes of the furnace where primary reforming is effected. The primary reformate from furnace 106 is discharged via line 108 and is introduced into the secondary catalytic reformer 110 together with oxygen admitted via line 112. In the secondary reformer a portion of the methane is oxidized (burned) to provide additional heat to reform the remaining methane in the catalyst bed. The $CH_4$ concentration in the effluent from the secondary reformer 110 is about 0.2% (dry basis).

The secondary reformate is cooled and sent via line 115 to the solvent extraction unit 120 where the bulk of containted $CO_2$ is selectively removed by a solvent such as monoethanolamine (MEA). The $CO_2$-freed gas product (line 117) is cooled at 116 to a temperature of about 100° F. effecting condensation of most of the water and the condensate 127 is removed in vapor/liquid separator 121, obtaining an uncondensed gas overhead fraction (line 128) comprised essentially of hydrogen and carbon monoxide (~99+%), the remainder comprising chiefly small to trace amounts of one or more contaminants such as water, methane, carbon dioxide, and nitrogen. The MEA solvent is regenerated by stripping dissolved $CO_2$ therefrom with heat generated by steam and process gas. The stripped $CO_2$ is compressed and recycled to the primary reformer (line 130).

The uncondensed fraction (line 128) from separator 121 is passed on to further treatment by selective adsorption of CO therefrom in a multibed PSA unit 140 thereby obtaining a recovered unadsorbed effluent (line 134) of high purity hdyrogen (98.6%).

Various PSA systems known in the prior art can be employed in separation of components from a gas composition composed chiefly of CO and hydrogen, with greater or less efficiency.

Figure 3:
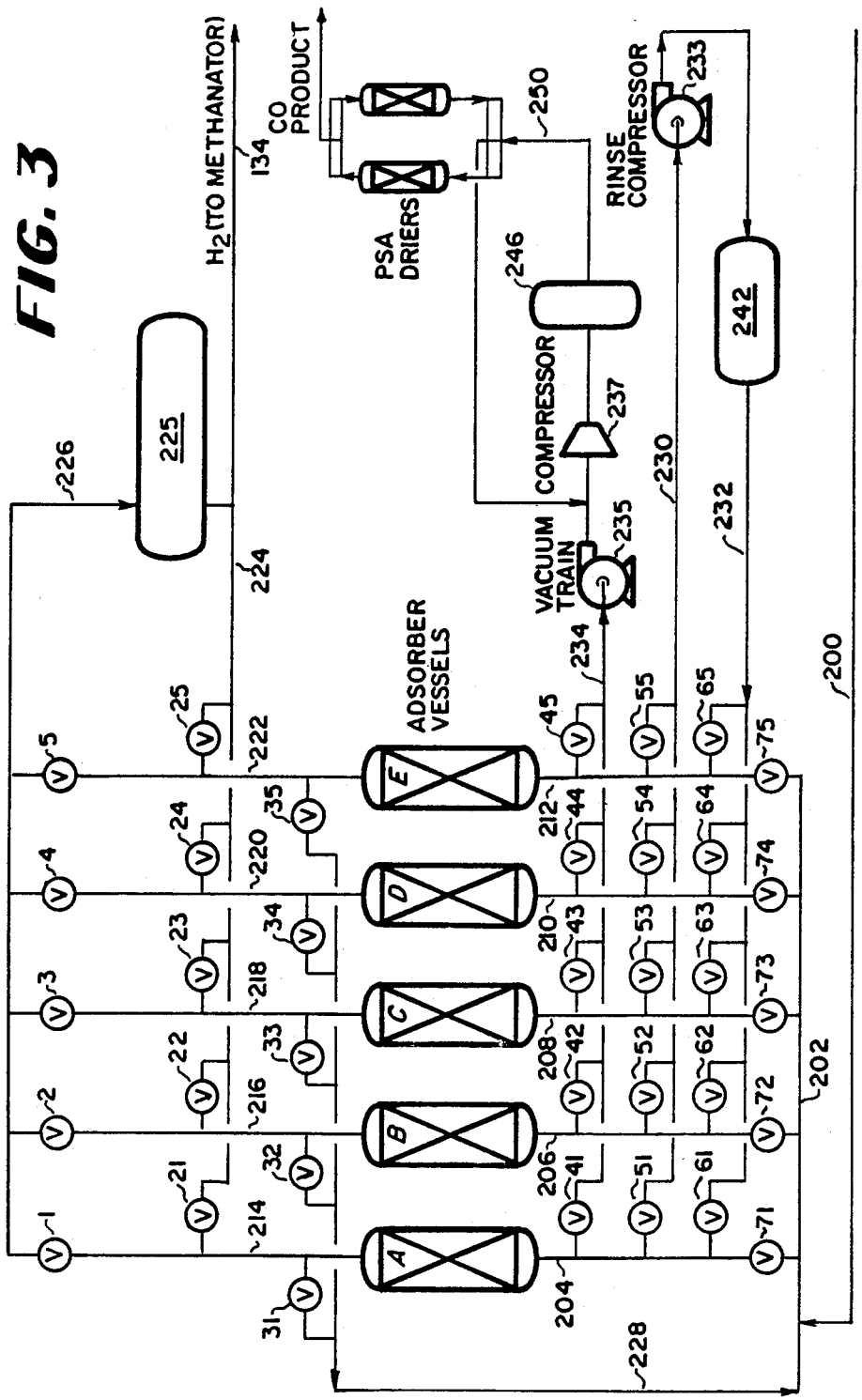
FIG. 3 is a process flow diagram of a preferred pressure swing adsorption unit that may be employed in practice of the invention, for separation and individual recovery of hydrogen and carbon monoxide from a mixture containing these components.

The preferred PSA system employed in practice of the invention to recover both high purity CO and $H_2$, as illustrated in FIG. 3, comprises five columns operated in parallel, each column containing a bed of adsorbent selective in retention of carbon monoxide while permitting unsorbed hdyrogen to flow through the bed to withdrawal. As adsorbent, one may preferably employ 5A molecular sieve.

The mixed gas stream charged to the then on-stream column of PSA unit 140, as above indicated, will consist essentially of hydrogen and carbon monoxide at a $H_2/CO$ mole ratio of about 2.5. Each of the columns in turn, will undergo the following sequence of operations during a designed cycle.

a. Adsorption of CO from feed gas charge at superatmospheric pressure.

b. Rinsing of CO-laden bed with CO obtained in the depressurization step and introduced to flow cocurrent to feed direction at prevailing superatmospheric pressure.

c. Pressure let-down by gas withdrawal from column countercurrent to feed direction to about atmospheric pressure.

d. Evacuation of column countercurrent to feed direction for desorption of contained carbonmonoxide.

e. Repressure the column with high purity hydrogen countercurrent to feed direction thereby restoring superatmospheric pressure.

Referring to FIG. 3, the five columns are labeled A through E. Assuming that Column A is then on-stream, having been brought to desired superatmospheric pressure with product hydrogen from storage or from a companion column then discharging product hydrogen, the gas friction shown in FIG. 2 as stream 128 is supplied to the column of the PSA unit via line 200 and manifold 202 at a pressure in the range of 50 to 500 psia.

The fresh feed in line 200 is combined with recycle gas from a then rinsing bed in line 228, and the combined gas mixture is introduced into Column A via line 204, valves 71 and 1 being open. Carbon monoxide and certain amounts of the minor accompanying contaminants will be adsorbed in the column while hydrogen of high purity passes through the adsorbent bed into manifold 226 via discharge line 214, and is collected in vessel 225 from which the hydrogen may be withdrawn as desired. It will be understood that Columns B, C, D, and E, in turn, operate in similar manner via lines 206, 208, 210, 212, 216, 218, 220, and 222. A portion of the gas in line 226 or vessel 225 is used for the repressuring step as hereinafter described. When the carbon monoxide, which is selectively adsorbed by the adsorbent bed of Column A, reaches its saturation level with the mass transfer front near the downstream end of the bed therein, the adsorption step of Column A is terminated and the further feed of gas to be treated is switched to a companion column of the PSA system.

After termination of the adsorption step in Column A, by closing valves 71 and 1, the column is cocurrently rinsed (in the feed gas direction) and at the feed pressure (in the range of 50-500 psia) with carbon monoxide of high purity. The rinse gas compressed at 233 to required pressure, is withdrawn from surge tank 242 and passed into Column A via line 232 and open valve 61. The rinse gas passes through the adsorbent bed, removing void gas and a portion of co-adsorbed gas present. The rinse step is continued until the end of the predetermined fixed time period such that carbon monoxide is approximately at breakthrough at the downstream end of Bed A.

The rinse effluent is discharged from Bed A through open valve 31 and is recycled in line 228 and blended with the fresh feed supplied by line 200. At the termination of the rinse step, the adsorbent bed in Column A is now saturated with high pressure carbon monoxide. With the appropriate change in the settings of the valves involved, carbon monoxide is desorbed from the bed in Column A by countercurrent gas withdrawal, depressuring the column through open valve 51. The desorbed gas is withdrawn in line 230, fed to suction inlet of compressor 233, and used as rinse gas for a companion bed. When the pressure in Column A is at about the atmospheric level, Column A is switched to the evacuation step of cycle sequence. Gas withdrawal from the column is effected through open valve 41 into line 234 by vacuum pump 235. The gas obtained in the evacuation step is a high purity wet CO product. The CO from the vacuum train is compressed to the desired pressure preferably 60 to 100 psia and fed to holding tank 246, which provides a smooth process flow. Water is removed from the CO product by passing the holding tank effluent (line 250) through a two bed PSA drier system comprised of alternately operated parallel adsorbent columns. A portion of the dry CO product from the drier on feed is used as purge gas to regenerate the saturated companion bed. The low pressure purge stream is recycled to the CO compressor (237) where the contained water is condensed and removed.

Following evacuation of Column A, that column is repressurized to the fresh feed pressure for renewed adsorption and initiation of a new cycle. Repressurization is carried out in countercurrent direction by admitting hydrogen from a companion column through open valve 21 and line 224, to deliver the repressuring gas at the designed feed pressure level into Column A until that column reaches that level (in the range of 50–500 psia). By the admission of the repressuring gas, any residual carbon monoxide present is driven towards the front end of the bed and places the column in condition to undergo another repetition of the operating sequence.

Each of the companion B, C, D, and E goes through a similar cycle and in operating in conjunction with one another the system provides a continuous product flow.

The cycle time for the five-column PSA system of FIG. 3 and the valve positions of the associated valves are set out in Tables 1 and 2.

TABLE 1

| TIME UNIT | COLUMN | | | | |
|---|---|---|---|---|---|
| | A | B | C | D | E |
| 1 | ADS | RP | EVAC | DP | RINSE |
| 2 | " | " | " | " | " |
| 3 | " | " | " | " | " |
| 4 | " | " | " | " | " |
| 5 | RINSE | ADS | RP | EVAC | DP |
| 6 | " | " | " | " | " |
| 7 | " | " | " | " | " |
| 8 | " | " | " | " | " |
| 9 | DP | RINSE | ADS | RP | EVAC |
| 10 | " | " | " | " | " |
| 11 | " | " | " | " | " |
| 12 | " | " | " | " | " |

TABLE 1-continued

| TIME | COLUMN | | | | |
|------|------|------|------|------|------|
| UNIT | A | B | C | D | E |
| 13 | EVAC | DP | RINSE | ADS | RP |
| 14 | " | " | " | " | " |
| 15 | " | " | " | " | " |
| 16 | " | " | " | " | " |
| 17 | RP | EVAC | DP | RINSE | ADS |
| 18 | " | " | " | " | " |
| 19 | " | " | " | " | " |
| 20 | " | " | " | " | " |

ADS → ADSORB CO FROM SYNGAS FEED
RINSE → RINSE BED WITH CO COCURRENT TO FEED DIRECTION
DP → DEPRESSURIZE COUNTERCURRENT TO FEED
EVAC → EVACUATE COUNTERCURRENT TO FEED
RP → REPRESSURIZE WITH $H_2$ EFFLUENT

TABLE 2
VALVE POSITION FIG. 3
VALVE POSITION (0 = Open; Otherwise Closed)

| TIME UNIT | 1 | 2 | 3 | 4 | 5 | 21 | 22 | 23 | 24 | 25 | 31 | 32 | 33 | 34 | 35 | 41 | 42 | 43 | 44 | 45 | 51 | 52 | 53 | 54 | 55 | 61 | 62 | 63 | 64 | 65 | 71 | 72 | 73 | 74 | 75 |
|---|---|---|---|---|---|---|---|---|---|---|---|---|---|---|---|---|---|---|---|---|---|---|---|---|---|---|---|---|---|---|---|---|---|---|---|
| 1  | 0 | 0 | 0 | 0 |   |   |   |   |   |   |   |   |   |   |   |   |   |   |   |   |   |   |   |   |   |   |   |   |   |   |   |   |   |   |   |
| 2  |   | 0 | 0 | 0 | 0 |   |   |   |   |   |   |   |   |   |   |   |   |   |   |   |   |   |   |   |   |   |   |   |   |   |   |   |   |   |   |
| 3  |   |   | 0 | 0 | 0 | 0 |   |   |   |   |   |   |   |   |   |   |   |   |   |   |   |   |   |   |   |   |   |   |   |   |   |   |   |   |   |
| 4  |   |   |   | 0 | 0 | 0 | 0 |   |   |   |   |   |   |   |   |   |   |   |   |   |   |   |   |   |   |   |   |   |   |   |   |   |   |   |   |
| 5  |   |   |   |   | 0 | 0 | 0 | 0 |   |   |   |   |   |   |   |   |   |   |   |   |   |   |   |   |   |   |   |   |   |   |   |   |   |   |   |
| 6  |   |   |   |   |   | 0 | 0 | 0 | 0 |   |   |   |   |   |   |   |   |   |   |   |   |   |   |   |   |   |   |   |   |   |   |   |   |   |   |
| 7  |   |   |   |   |   |   | 0 | 0 | 0 | 0 |   |   |   |   |   |   |   |   |   |   |   |   |   |   |   |   |   |   |   |   |   |   |   |   |   |
| 8  |   |   |   |   |   |   |   | 0 | 0 | 0 | 0 |   |   |   |   |   |   |   |   |   |   |   |   |   |   |   |   |   |   |   |   |   |   |   |   |
| 9  |   |   |   |   |   |   |   |   | 0 | 0 | 0 | 0 |   |   |   |   |   |   |   |   |   |   |   |   |   |   |   |   |   |   |   |   |   |   |   |
| 10 |   |   |   |   |   |   |   |   |   | 0 | 0 | 0 | 0 |   |   |   |   |   |   |   |   |   |   |   |   |   |   |   |   |   |   |   |   |   |   |
| 11 |   |   |   |   |   |   |   |   |   |   | 0 | 0 | 0 | 0 |   |   |   |   |   |   |   |   |   |   |   |   |   |   |   |   |   |   |   |   |   |
| 12 |   |   |   |   |   |   |   |   |   |   |   | 0 | 0 | 0 | 0 |   |   |   |   |   |   |   |   |   |   |   |   |   |   |   |   |   |   |   |   |
| 13 |   |   |   |   |   |   |   |   |   |   |   |   | 0 | 0 | 0 | 0 |   |   |   |   |   |   |   |   |   |   |   |   |   |   |   |   |   |   |   |
| 14 |   |   |   |   |   |   |   |   |   |   |   |   |   | 0 | 0 | 0 | 0 |   |   |   |   |   |   |   |   |   |   |   |   |   |   |   |   |   |   |
| 15 |   |   |   |   |   |   |   |   |   |   |   |   |   |   | 0 | 0 | 0 | 0 |   |   |   |   |   |   |   |   |   |   |   |   |   |   |   |   |   |
| 16 |   |   |   |   |   |   |   |   |   |   |   |   |   |   |   | 0 | 0 | 0 | 0 |   |   |   |   |   |   |   |   |   |   |   |   |   |   |   |   |
| 17 |   |   |   |   |   |   |   |   |   |   |   |   |   |   |   |   | 0 | 0 | 0 | 0 |   |   |   |   |   |   |   |   |   |   |   |   |   |   |   |
| 18 |   |   |   |   |   |   |   |   |   |   |   |   |   |   |   |   |   | 0 | 0 | 0 | 0 |   |   |   |   |   |   |   |   |   |   |   |   |   |   |
| 19 |   |   |   |   |   |   |   |   |   |   |   |   |   |   |   |   |   |   | 0 | 0 | 0 | 0 |   |   |   |   |   |   |   |   |   |   |   |   |   |
| 20 |   |   |   |   |   |   |   |   |   |   |   |   |   |   |   |   |   |   |   | 0 | 0 | 0 | 0 |   |   |   |   |   |   |   |   |   |   |   |   |

The hydrogen product recovered from the PSA unit in vessel 225, as heretofore indicated, will have a purity of 98.6%. For certain industrial applications even trace to small amounts of certain contaminants, such as CO for example, are not acceptable. The hydrogen product recovered from the PSA unit can be freed of such contaminants by heating and subjecting the same to catalytic methanation by methods well known in the art, as indicated in FIG. 2. Thus, the small amount of CO contained in the hydrogen product withdrawn from vessel 225 (shown in FIG. 3) of PSA system 140 is heated by exchange with methananted product and is passed by line 134 into and through methanator 150 wherein C is converted to methane by reaction with the hydrogen as indicated by the equation:

$$CO + 3H_2 \rightarrow CH_4 + H_2O$$

A portion of the purified hydrogen stream thus obtained is compressed and recycled via line 146 for use in the primary reforming operation, as described.

A typical set of stream flow rates, their compositions, temperatures, and pressures in accordance with the preferred mode for practice of the invention, are set out in Table 3, identifying key streams by their numbers referenced in FIG. 2.

TABLE 3

| Stream Number | 128 | 132 | 134 | 148 | 101 | 107 | 108 | 117 |
|---|---|---|---|---|---|---|---|---|
| Components (# moles/hr) | | | | | | | | |
| Methane | 2.6 | 0.3 | 2.3 | 10.2 | 283.6 | 283.6 | 70.3 | 2.6 |
| Ethane | — | — | — | — | 10.1 | 10.1 | — | — |
| Propane | — | — | — | — | 1.6 | 1.6 | — | — |
| Butane | — | — | — | — | 0.7 | 0.7 | — | — |
| Pentane | — | — | — | — | 0.3 | 0.3 | — | — |
| Hydrogen | 804.3 | 0.1 | 804.2 | 761.7 | — | 18.0 | 752.1 | 804.3 |
| Carbon Monoxide | 313.3 | 305.2 | 8.1 | — | — | — | 224.1 | 313.3 |
| Carbon Dioxide | 20 ppm | 74 ppm | — | — | 2.6 | 193.8 | 213.7 | 20 ppm |
| Oxygen | — | — | — | — | — | — | — | — |
| Nitrogen | 1.1 | — | 1.1 | 1.1 | 1.1 | 1.1 | 1.1 | 1.1 |
| Sulfur | | | | | Tr | | | |
| Water | 5.0 | 127 ppm | — | 7.9 | — | 994.3 | 730.5 | 9.3 |
| Total Flow | 1126.3 | 305.6 | 815.7 | 780.9 | 300.2 | 1503.8 | 1991.7 | 1130.6 |
| Pressure (psia) | 220 | 15 | 215 | 200 | 315 | 300 | 275 | 226 |
| Temperature (°F.) | 100 | 100 | 100 | 100 | 87 | 1022 | 1500 | 100 |

An important feature of the present invention (although not limited to that feature) is the use of an oxygen secondary reformer as a supplement to the primary steam reforming step. By use of such supplement, less severe operating conditions may be efficiently employed in the primary reforming furnace, including particularly lower reforming temperature and low steam/carbon ratio. The obtained reformate, largely freed of water vapor and substantially free of carbon dioxide, will typically comprise over 99% carbon monoxide and hydrogen, so that the carbon monoxide component can be economically recoverd at high purity (99%+ on water-free basis) by selective adsorption, avoiding the higher capital costs entailed in conventional methods requiring use of driers, refrigeration, and cryogenic fractionation (cold box). In addition, the secondary reformer provides a higher methane conversion and therefore decreases the methane content in the product hydrogen and carbon monoxide.

What is claimed:

1. The method of producing indivdiual high purity streams of hydrogen and carbon monoxide which comprises:
   (a) subjecting a gas feed rich in methane to two-stage reforming wherein said feed undergoes reaction with steam in the first stage and further reaction in the presence of added oxygen in said second stage, thereby producing a mixed gas composition containing hydrogen and carbon monoxide as key components accompanied by carbon dioxide and minor gaseous contaminants,
   (b) subjecting said mixed gas composition to absorptive contact with a solvent selective in dissolving carbon dioxide, cooling the undissolved substantially $C_2$-free gaseous remainder of said composition to a temperature effective for condensation of water vapor contained therein,
   (c) separating condensed water from the remaining vapor and passing said vapor at superatmospheric pressure as feed through a bed of solid adsorbent selective for sorption of carbon monoxide, thereby recovering hydrogen as an unsorbed primary effluent discharged from said adsorbent bed, and
   (d) recovering the sorbed carbon monoxide from said bed by desorption at reduced pressure.

2. The method as defined in claim 1 wherein said first stage reforming is carried out at relatively low severity, including temperatures in the range of 1300° F. to 1600° F. and at a steam-to-carbon ratio no greater than 6.0.

3. The method as defined in claim 1 wherein said solvent absorption of carbon dioxide is effected with monoethanolamine.

4. The method as defined in claim 1 wherein said bed of solid adsorbent is one of a group of such beds operated cyclically in parallel by pressure swing technique and wherein each of said beds undergoes during an operating cycle the steps of:
   (a) adsorption of carbon monoxide from the feed gas charged to the bed at superatmospheric pressure,
   (b) followig step (a) rinsing the bed with a portion of the carbon monoxide stream obtained from the depressurization of an accompanying bed, (c) then reduced the pressure in the rinsed bed by withdrawal of gas therefrom to about atmospheric pressure level, followed by (d) removal of carbon monoxide from said bed by evacuation to subatmospheric level, and (e) repressuring the bed with product hydrogen to the superatmospheric pressure level of step (a).

5. The method as defined in claim 4 wherein said solid adsorbent comprises 5A molecular sieve.

6. The method as defined in claim 4 wherein the hydrogen product recovered as primary effluent from said adsorbent bed is subjected to methanation for conversion of residual carbon monoxide contained therein.

7. The method as defined in claim 1 wherein the hydrogen product recovered as primary effluent from said adsorbent bed is subject to methanation for conversion of residual carbon monoxide contained therein.

8. The mehtod as defined in claim 1 wherein said mixed gas composition is one obtained by two-stage reforming of natural gas, said first stage being conducted at a temperature in the range of 1300° F. to 1600° F. and at a steam/carbon ratio of 3 to 6; and said second stage being carried out with addition of oxygen to the first stage reformate to provide the obtained two-stage reformate at a discharge temperature in the range of 1500° F. to 2100° F.

* * * * *

UNITED STATES PATENT AND TRADEMARK OFFICE
CERTIFICATE OF CORRECTION

PATENT NO. : 4,861,351

DATED : August 29, 1989

INVENTOR(S) : Nicholas, et al

It is certified that error appears in the above-identified patent and that said Letters Patent is hereby corrected as shown below:

Column 12, Line 16
    Replace "$C_2$" with -- $CO_2$ --
Column 13, Line 1
    Replace "reduced" with -- reducing --
Column 14, Line 3
    Replace "subject" with -- subjected --
Column 14, Line 5
    Replace "mehtod" with -- method --

Signed and Sealed this

Twelfth Day of February, 1991

*Attest:*

HARRY F. MANBECK, JR.

*Attesting Officer*      *Commissioner of Patents and Trademarks*